United States Patent [19]

Durot et al.

[11] Patent Number: 4,486,361

[45] Date of Patent: Dec. 4, 1984

[54] APPARATUS FOR INTRODUCING GAS INTO A LIQUID MASS

[75] Inventors: Jean Durot, Villepreux; Ronald Moreau, Rueil Malmaison, both of France

[73] Assignee: Degremont, Rueil-Malmaison, France

[21] Appl. No.: 221,411

[22] Filed: Dec. 30, 1980

[30] Foreign Application Priority Data

Jan. 9, 1980 [FR] France ................................. 80 00398

[51] Int. Cl.³ ............................................... B01F 3/04
[52] U.S. Cl. ................................... 261/123; 209/170; 210/221.2; 261/77
[58] Field of Search .................. 261/77, 79 A, 114 A, 261/114 JP, 114 TC, 121 R, 123; 210/220, 221 P; 209/170

[56] References Cited

U.S. PATENT DOCUMENTS

| 708,058 | 9/1902 | Martinson | 261/77 |
| 1,407,258 | 2/1922 | Connors | 261/123 |
| 2,353,195 | 7/1944 | Sims | 261/77 |
| 2,510,589 | 6/1950 | Kraft | 261/114 A |
| 3,617,033 | 11/1971 | Ichikawa et al. | 261/77 X |
| 3,722,679 | 3/1973 | Logue | 261/123 X |
| 3,778,980 | 12/1973 | Vancini | 261/79 A X |
| 3,852,384 | 12/1974 | Bearden | 261/77 |
| 4,107,240 | 8/1978 | Verner et al. | 261/123 X |
| 4,138,335 | 2/1979 | Murphy | 261/123 X |

Primary Examiner—Richard L. Chiesa
Attorney, Agent, or Firm—Wenderoth, Lind & Ponack

[57] ABSTRACT

An apparatus for introducing gas into a liquid mass, particularly at a certain depth therein, includes at least one emulsifying tube adapted to be positioned within the liquid mass and to be vertically aligned above a gas port. The tube has at a lower portion thereof structure for receiving therein gas from the gas port and liquid from the liquid mass, such that the gas and liquid form an emulsion flowing upwardly through the tube. The tube has at an upper portion thereof, structure opening downwardly into the liquid mass for reversing the flow of the emulsion and for then discharging the emulsion downwardly into the liquid mass. Such reversing and discharging structure may be the form of a bend in the upper end of the tube or in the form of a hood mounted above and confronting the upper open end of the tube.

14 Claims, 12 Drawing Figures

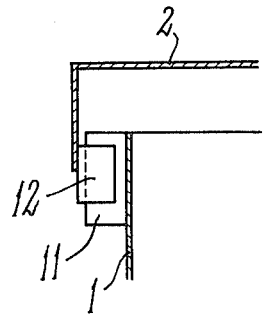
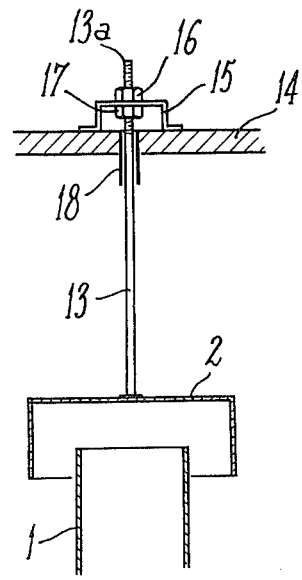
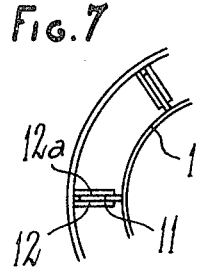
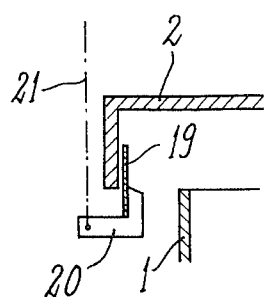
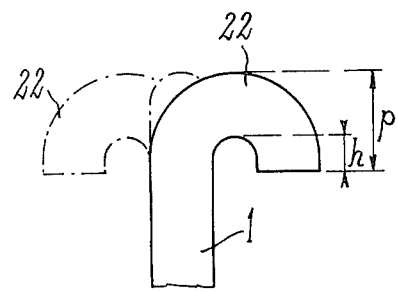
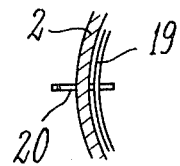
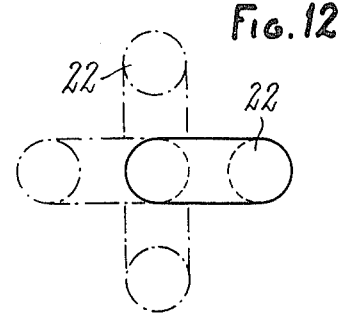

APPARATUS FOR INTRODUCING GAS INTO A LIQUID MASS

BACKGROUND OF THE INVENTION

The present invention relates to an apparatus for introducing gas, for example air, oxygen, methane, etc., into a liquid mass, at a certain or particular depth therein, thereby making it possible to diffuse the gas into the liquid, while simultaneously obtaining a desired effect of mixing and homogenization. This apparatus is most particularly usable in sewage treatment installations involving activated sludge. However, it is intended that the scope of the present invention be applicable to any type of installation requiring a gas diffusion in a liquid, at a certain depth therein.

There are known devices of the type which are immersed in a liquid, particularly devices for the diffusion of air in water treatment tanks employing activated sludge. In this type of device, air is pumped from the atmosphere by a compressor through a piping system which releases the air in a liquid in rather fine bubbles. The use of this type of apparatus necessitates a compromise between a high transfer yield, i.e. the transfer to the liquid in dissolved form of the maximum percentage of gas blown in, with a mixing capacity sufficient to obtain adequate homogenization of the liquid mass and perhaps also to suspend solid matter within the liquid mass, a very important feature in the case of activated sludge systems. Moreover, the consumption of energy must be maintained at a minimum.

The simplest known method for introducing gas into a liquid involves the use of a tubing or piping system which is immersed horizontally within the liquid and is fed with the gas, for example air, and frees the gas through calibrated orifices which are regularly spaced along the line of the piping system. The gas bubbles released, as they rise toward the surface of the liquid, surrender a portion of their constituent elements to the resultant rising stream, yielding oxygen for example, and give rise to circulation of the liquid mass by virtue of the ascending effect of low-density emulsified zones. This type of device has the disadvantage of having a low energy transfer yield and of resulting in inadequate mixing, particularly in the bottom areas of the tank, whenever the demand for gas is slight and requires only a reduced gas flow.

Another known device makes it possible to improve mixing without increasing the flow of gas and includes a vertical tube, open at both ends, designed to channel the injected gas, thereby serving as an emulsion pump and ensuring a substantial transit flow. This type of system makes it easier to ensure the taking up and recirculation of the lower levels of the liquid mass than with the known device described above, with equal flows of air or other gas. However, the transfer yield of this known device is no better, and in fact the improvement in gas transfer, oxygen transfer for example, stemming from the high level of turbulence in the tubing is cancelled out by the reduced period during which the gas bubbles remain in the liquid mass, since the gas bubbles rise more rapidly to the open upper surface of the liquid.

A third type of known device includes an emulsion tube containing in the interior thereof baffles of various shapes designed to promote turbulence and to create a load loss in order to increase the time of stay of the bubbles within the liquid gas. The transfer of gas, such as oxygen, is thus improved. However, this type of device has the drawback of slowing the flow of gas from the tube, and thus the pumping and mixing capabilities of this type of device are limited.

SUMMARY OF THE INVENTION

With the above discussion in mind, it is the object of the present invention to provide an improved apparatus for introducing gas into a liquid mass, at a certain depth therein, which overcomes the prior art disadvantages and makes it possible to substantially improve the gas transfer, and thus the efficiency of energy usage, while at the same time maintaining a high pumping flow rate.

This object is achieved in accordance with the present invention by the provision of an apparatus for introducing gas into a liquid mass, at a certain depth therein, such apparatus including an emulsifying tube immersed in the liquid mass and vertically aligned above a gas port. The tube has an open lower end which receives gas from the gas port and liquid, such that the gas and liquid form in a emulsion flowing upwardly through the tube. The tube has at an upper portion thereof, means opening downwardly into the liquid mass for reversing the ascending flow of the gas-liquid emulsion and for then discharging such emulsion downwardly into the liquid mass.

In a preferred embodiment of the present invention the reversing and discharging structure includes a hood mounted above and confronting the upper open end of the tube and positioned to intercept the emulsion passing upwardly outwardly therefrom and to direct such emulsion downwardly into the liquid mass. The hood opens downwardly into the liquid mass about the entire periphery of the upper open end of the tube, and the diameter of the hood is greater than the diameter of the tube. The tube extends upwardly into the hood by a distance which is less than the total vertical depth of the interior of the hood, and preferably by a distance which is equal to from 0 to 5% of the total height of the hood. The value of the vertical depth of the interior of the hood, minus the distance of extension of the tube into the hood, equals approximately one-half the diameter of the hood. Various arrangements may be provided for adjusting the vertical position of the hood relative to the tube, and specifically for adjusting the distance of extension of the upper open end of the tube into the hood, i.e. for adjusting the relative vertical spacing between the bottom of the hood and the top of the tube.

In a simplified embodiment of the present invention, the reversing and discharging structure includes a bend in the upper portion of the tube, such that the tube includes a first length portion extending upwardly to an overflow and a second length portion extending downwardly from the overflow, the second length portion having a downwardly directed opening. The emulsion flows upwardly through the first length portion, then it flows over the overflow and downwardly through the second length portion, and is discharged downwardly through such opening into the liquid mass. The vertical spacing between the overflow and the opening is preferably from 0 to 5% of the total height of the tube.

BRIEF DESCRIPTION OF THE DRAWINGS

Other objects, features and advantages of the present invention will be apparent from the following detailed description of various embodiments thereof, with reference to the accompanying drawings, wherein:

FIGS. 6 and 7 are views similar to FIGS. 2 and 3, respectively, but of another system for mounting a hood above an emulsifying tube;

FIG. 8 is a partial schematic cross-sectional view of a further arrangement for adjustably mounting a hood above an emulsifying tube;

FIGS. 9 and 10 are views somewhat similar to FIGS. 2 and 3 respectively, but of an arrangement for adjusting the relative position between the bottom end of a hood and the upper end of an emulsifying tube; and FIGS. 11 and 12 are partial schematic elevation and plan views, respectively, of a modified embodiment of the present invention.

DETAILED DESCRIPTION OF THE INVENTION

Figure 1:
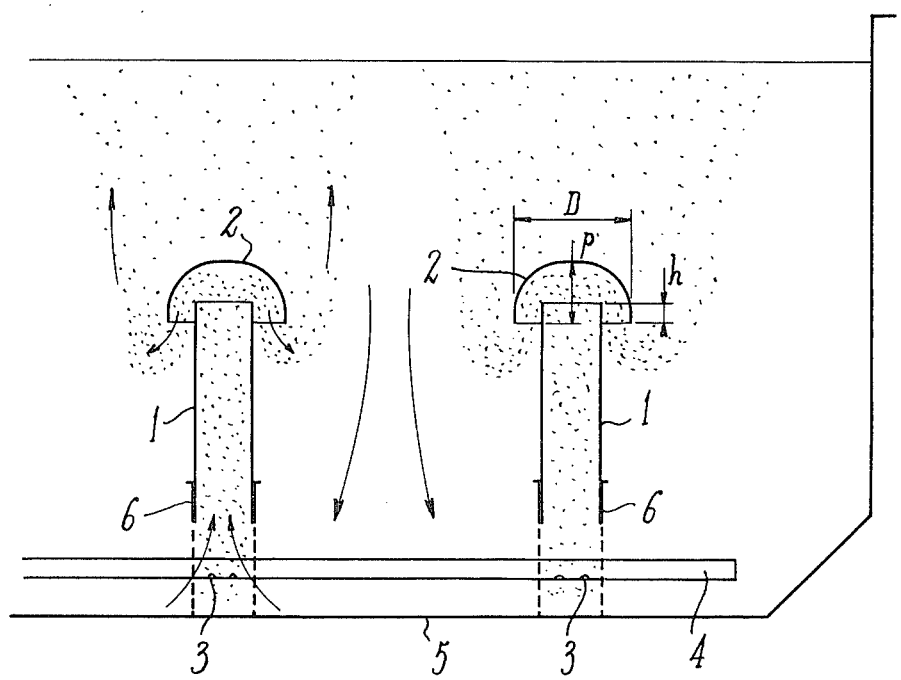
FIG. 1 is a partial schematic cross-sectional view of a water treatment tank equipped with two devices according to the present invention for introducing gas into the liquid mass within the water treatment tank.

With reference now to FIG. 1 of the drawings, the manner of usage of the present invention will be described. Thus, there is illustrated a water treatment tank including a tank bottom and containing therein a liquid mass. The term "liquid mass" as employed herein is intended to encompass merely a liquid or any type of mixture including liquid and sediment or particles which are known by those skilled in the art, and particularly to the sewage treatment art. Extending adjacent the tank bottom 5 and immersed within the liquid mass is a gas supply tube 4 having therein orifices 3 which form gas ports for injecting gas into the liquid mass. An emulsifying tube 1 is positioned within the liquid mass and is vertically aligned above the gas port or orifices 3. As illustrated in FIG. 1 there are two groups of orifices 3, with an emulsifying tube 1 being vertically positioned above each group of orifices. It is of course to be understood that the scope of the present invention encompasses the use of a single tube 1 or a plurality more than two of such tubes. The tube 1 is supported within a support 6 which may also be employed to support the gas tube 4. Support 6 is heavily perforated as schematically illustrated in FIG. 1 to provide no substantial impediment to the entry of liquid into the bottom of tube 1.

Tube 1 has an open lower end which receives therein gas from the orifices 3 and liquid from the bottom of the liquid mass. This results in the gas and liquid forming a gas-liquid emulsion flowing upwardly through the interior of the tube 1.

In the arrangement shown in FIG. 1 it will be apparent that orifices 3 are formed in the tube 4, generally on the lower portion therein, in a calibrated manner such that they ensure a loss of gas pressure such that there is an equal distribution of gas to all of the tubes 1. The gas freed by the orifices 3 is channeled into the emulsifying tube 1, and the liquid from the bottom of the tank also flows into the bottom of the tube 1. This generates an emulsion pumping effect which develops hydraulic energy needed for a subsequent reversal of flow of the emulsion in accordance with the present invention. Thus, the upper portion of the tube 1 has structure opening downwardly into the liquid mass for reversing the flow of the emulsion and for then discharging the emulsion downwardly into the liquid mass.

In accordance with the embodiment of FIG. 1, such reversing and discharging structure is in the form of a hood 2 mounted above and confronting the upper open end of the tube 1 and positioned to intercept the emulsion passing upwardly outwardly therefrom and to direct such emulsion downwardly into the liquid mass. The hood 2 may have various different shapes depending upon the material used, for example a flatbottom cylinder for a hood manufactured of metal or reinforced concrete, a rounded hood with a spheroidal or ellipsoidal upper end for a hood manufactured of a rigid plastic material. The diameter of hood 2 is preferably from 1.5 to 2 times the diameter of tube 1. The upper end of tube 1 penetrates into the vertical interior depth p of hood 1 by a distance h which is less than p, which preferably is adjustable, and which preferably is from 0 to 5% of the total height of the tube. The overall vertical interior depth p of the hood is such that p minus h is approximately one-half the diameter of the tube. In the hood, the emulsion is intercepted and becomes very turbulent, such that the emulsion emerges downwardly from the bottom of the hood and draws gas bubbles downwardly at a speed of about 1 meter per second.

The hood 2 may be mounted above the tube 1 by any convenient structural device or system. A number of such systems are illustrated in FIGS. 2–10 and will now be described.

Figure 2:
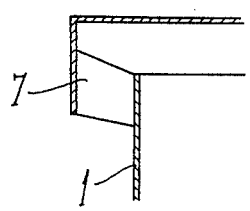
FIGS. 2 and 3 are respectively a partial schematic vertical cross-sectional view and a partial schematic horizontal cross-sectional view of one arrangement for mounting a hood above an emulsifying tube according to the present invention.
Figure 3:
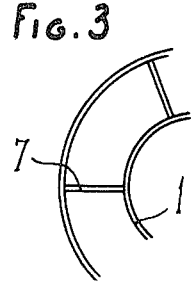

Thus, in FIGS. 2 and 3 the hood is attached to the outer surface of the emulsifying tube 1 by generally radially extending blades 7 which may be connected to the tube, or may be connected to the hood. Alternatively, some blades may be connected to the hood and others may be connected to the tube. The disposition and shape of the blades 7 may vary as desired or convenient. For example, the blades can have a helix shape with an inclination of from 0° to 45° from the vertical and may be arranged entirely within the hood or may extend partially below the hood, in order to create a rotational or twisting motion to the flow of emulsion discharged downwardly from the hood. This increases the length of the trajectory of the discharged downwardly flowing emulsion, and therefore increases the staying time of the gas bubbles in the liquid.

The end of the hood may be pierced with orifices to make it possible for gas to escape into the liquid above the hood, with a system of deflectors ensuring distribution of the gas.

Figure 4:
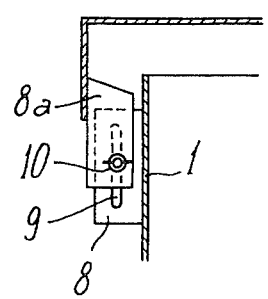
FIGS. 4 and 5 are views similar to FIGS. 2 and 3, respectively, but of another arrangement 7 for adjustably mounting a hood above an emulsifying tube.
Figure 5:
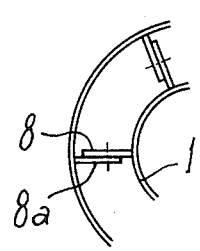

It is advantageous that the relative vertical position of the hood with respect to the tube be adjustable, and such a system is shown in FIGS. 4 and 5. In this arrangement, radial blades 8 are attached to the outer wall of the tube 1, and radial blades 8a are attached to the inner wall of the hood. The blades have therein slots 9 into which extends an attachment arrangement 10 for locking the blades together at selected vertically adjustable relative positions.

FIGS. 6 and 7 illustrate an arrangement whereby one blade 11 on the tube 1 is positionable or inset between two blades 12 and 12a on the hood. The arrangement may be just the opposite such that blade 11 is mounted on the hood 2, and blades 12 and 12a are mounted on tube 1.

FIG. 8 illustrates an arrangement for adjusting the distance h without interrupting operation of the system. A control rod 13 is connected to the top of hood 2 and is adapted to be operated above additional structure 14, such as a platform, without interruption of operation. Upper end 13a of rod 13 is threaded and passes through a clamp 15 and is threaded onto adjustment nut 16 and locknut 17. Rod 13 passes through platform 14 via sleeve 18 which may be provided with seal devices. It will be apparent from the above description that by manipulation of nuts 16 and 17 with respect to threaded end 13a of rod 13, the hood 2 may be raised or lowered without interruption of operation.

In the arrangement described above regarding FIG. 8, the entire hood is adjustable. However, it is possible that the hood 2 be maintained fixed, while still adjusting the distance h. Such an arrangement is shown in FIGS. 9 and 10 wherein a skirt 19 is provided at the bottom of the hood. Skirt 19 is supported by supports 20 which are connected to rods or cables 21 which may be controlled in a manner similar to the control of rod 13 in FIG. 8.

While the hood may be made of the various types of materials discussed above, the emulsifying tube 1 may be formed of various materials, such as galvanized steel, stainless steel, concrete, or plastic. The material of the tube may differ from the material used for the hood, particularly for larger apparatuses.

With reference now to FIGS. 11 and 12, a further, somewhat more simplified, embodiment of the present invention will be described. In this arrangement, the reversing and discharging structure is not in the form of a separate hood, but rather is in the form of a bend 22 formed in the upper portion of the tube 1. Thus, the tube 1 has a first length portion extending vertically upwardly from the orifices 3 to an overflow and a second length portion extending downwardly from the overflow. The second length portion has a downwardly directed opening. The emulsion flows upwardly through the first length portion, then flows over the overflow and downwardly through the second length portion, and is discharged downwardly through the opening into the liquid mass. As shown in FIGS. 11 and 12, the relative direction of the bend 22 and the discharge of the emulsion may be varied within the liquid mass by merely rotating tube 1 without displacing tube 1. As shown in FIG. 11, there is a vertical spacing h between the overflow and the opening, and preferably such vertical spacing is from 0 to 5% of the total height of tube 1.

The device according to the present invention provides a substantial improvement in gas transfer, and thus in energy efficiency, while maintaining a high pump flow rate. In fact, the hood mounted above the emulsifying tube results in a reversal of the direction of flow of the emulsion at the tube outlet. The flow of emulsion leaves the hood vertically downwardly at a speed in the order of 1 meter per second and draws with it gas bubbles which move downwardly until they reach zero velocity before resuming their rise toward the surface of the liquid mass. On the other hand, in known devices, the flow of the emulsion leaving the emulsifying tube vertically upwardly has a speed on the order of 2 meters per second for a conventional emulsifying tube and a speed of 0.7 meter per second for a perforated tube. In accordance with the device of the present invention, therefor, as well as there being provided an improvement in the trajectory of the bubbles and the duration of stay of the bubbles within the liquid mass, there is an improvement in gas transfer. Intense turbulence is formed within the hood 2 or bend 22. When employing the hood 2, the gas bubbles are distributed over a greater horizontal area and accordingly are better dispersed in the liquid mass than in known arrangements wherein the bubbles merely rise straight upwardly after their release from the emulsifying tube, hence limiting any coalescence phenomena which are harmful in these circumstances.

The trajectory the gas bubbles are forced to follow by the hood above the emulsifying tube substantially increases the time during which the gas remains in the liquid, particularly in the deeper areas of the liquid mass, and results in a net increase in gas transfer, roughly 20 percent greater than the transfer obtained in known devices. The improved distribution of the gas bubbles in the liquid, even at deeper areas of the liquid mass, which results from reversing the direction of flow of the emulsion leaving the emulsifying tube also promotes and improves the maintenance in suspension of solid materials in the liquid mass.

Although various structural features of the present invention have been described and illustrated in detail, it is to be understood that such specifically described and illustrated features are exemplary of the present invention only, and that other forms, proportions and arrangements may be adopted without departing from the scope of the present invention.

We claim:

1. An apparatus for introducing gas into a liquid mass at a certain depth therein, said apparatus comprising:
    a treatment tank containing therein a liquid mass to be treated;
    a gas port positioned within said tank for discharging gas into said liquid mass;
    a emulsifying tube vertically positioned within said liquid mass, said tube having extending vertically upwardly therethrough an emulsion passage having a substantially uniform inner size throughout the entire height thereof;
    said tube having at a lower portion thereof means for receiving therein gas from said gas port and liquid from said liquid mass, such that said gas and liquid in the form of an emulsion flow upwardly through said tube;
    said tube having at an upper portion thereof an overflow and means opening downwardly into said liquid mass for reversing the flow of said emulsion of gas and liquid and for then discharging substantially all of said gas and liquid downwardly into said liquid mass; and
    said reversing and discharging means having vertically downwardly extending discharge surfaces defining a discharge opening, said reversing and discharging means being submerged within said liquid mass to a depth sufficient to ensure that said gas and liquid discharged thereby is directed substantially vertically downwardly into said liquid mass, to a depth below the surface thereof and toward the bottom thereof, the vertical spacing between said overflow and said opening being from 0 to 5% of the total height of said tube.

2. An apparatus as claimed in claim 1, wherein said reversing and discharging means comprises a bend in said upper portion of said tube, such that a first length portion of said tube extends vertically upwardly to said overflow and a second length portion of said tube extends downwardly from said overflow, said second length portion having a downwardly directed said opening defined by said vertically downwardly extending discharge surfaces, whereby said emulsion flows upwardly through said first length portion, then flows over said overflow and downwardly through said second length portion, and is discharged vertically downwardly through said opening into the liquid mass.

3. An apparatus as claimed in claim 1, wherein said reversing and discharging means comprises a hood mounted above and confronting an upper open end of said tube and positioned to intercept said eumulsion passing upwardly outwardly therefrom and to direct said emulsion downwardly into the liquid mass, the bottom of said hood being defined by said vertically downwardly extending discharge surfaces.

4. An apparatus as claimed in claim 3, wherein said hood opens downwardly into the liquid mass about the entire periphery of said upper open end of said tube, and the diameter of said hood is greater than the diameter of said tube.

5. An apparatus as claimed in claim 4, wherein said tube extends upwardly into said hood by said distance equal to from 0 to 5% of the total height of said tube.

6. An apparatus as claimed in claim 5, wherein the total vertical depth of the interior of said hood minus said distance equals approximately one-half said diameter of said tube.

7. An apparatus as claimed in claim 3, further comprising means for mounting said hood above said tube.

8. An apparatus as claimed in claim 7, wherein said mounting means comprise blades mounted on at least one of said tube and said hood and extending therefrom toward the other of said tube and said hood.

9. An apparatus as claimed in claim 8, wherein said blades extend in directions inclined to the longitudinal direction of said tube, to thereby impart a twisting motion to the flow of emulsion discharged downwardly from said hood.

10. An apparatus as claimed in claim 8, comprising said blades mounted on both said hood and said tube, and adjustable connecting means for joining said blades on said tube to said blades on said hood at selectively adjustable relative positions therebetween, and for thereby adjusting the relative vertical spacing between said tube and said hood.

11. An apparatus as claimed in claim 7, wherein said mounting means includes means for selectively adjusting the relative vertical spacing between said bottom of said hood and to the top of said tube.

12. An apparatus as claimed in claim 11, wherein said mounting and adjusting means comprises a control rod connected to said hood and adapted to be adjustably mounted on a structure positioned above said hood.

13. An apparatus as claimed in claim 11, wherein said hood is fixedly positioned with respect to said tube, and said bottom of said hood comprises a vertically adjustable skirt.

14. An apparatus as claimed in claim 1, wherein said receiving means at said lower portion of said tube comprises an open lower end of said tube.

* * * * *